(12) United States Patent
Gage et al.

(10) Patent No.: US 6,515,972 B1
(45) Date of Patent: Feb. 4, 2003

(54) DYNAMIC RADIO LINK ADAPTATION

(75) Inventors: William Anthony Gage, Stittsville (CA); Goran Janevski, Nepean (CA); Jagdish Sonti, Ottawa (CA); Risvan Coskun, Ottawa (CA); Gary Kenward, Manotick (CA)

(73) Assignee: Nortel Networks Limited., St. Laurent (CA)

( * ) Notice: Subject to any disclaimer, the term of this patent is extended or adjusted under 35 U.S.C. 154(b) by 0 days.

(21) Appl. No.: 09/263,517

(22) Filed: Mar. 5, 1999

(30) Foreign Application Priority Data

Dec. 30, 1998 (CA) .............................................. 2257319

(51) Int. Cl.[7] .............................. H04Q 7/00; H04J 3/16
(52) U.S. Cl. ........................................ 370/328; 370/464
(58) Field of Search ................................ 370/259, 229, 370/310, 310.1, 310.2, 328, 329, 431, 436, 437, 442–4, 468, 469, 465–7

(56) References Cited

U.S. PATENT DOCUMENTS

| 5,726,764 | A | | 3/1998 | Averbuch et al. ............ 358/403 |
|---|---|---|---|---|
| 5,729,536 | A | * | 3/1998 | Doshi et al. .............. 370/310.1 |
| 5,793,744 | A | * | 8/1998 | Kanerva et al. ............. 370/209 |
| 6,052,385 | A | * | 4/2000 | Kanerva et al. ............. 370/310 |
| 6,081,534 | A | * | 6/2000 | Sipila ......................... 370/466 |
| 6,181,686 | B1 | * | 1/2001 | Hamalainen et al. ........ 370/347 |
| 6,201,976 | B1 | * | 3/2001 | Rasanen ..................... 370/209 |
| 6,351,470 | B1 | * | 2/2002 | Rasanen ..................... 370/465 |

FOREIGN PATENT DOCUMENTS

WO    WO 97/00568    1/1997

* cited by examiner

Primary Examiner—David Vincent

(57) ABSTRACT

A radio link adapter for wireless transmission of multimedia data through a communication link between a radio access network (RAN) and a mobile station (MS), is provided. The information flow is constantly monitored to determine an information element (IE) type of service requirements and for allocating paired radio link adapters (RLAs) designed to fit the respective type of service requirements. A connection end may be initially established in the RAN or in the MS. An analyser monitors the link, detects the type of service (ToS) required, and dynamically allocates the appropriate type of RLA to the connection. There is no need to recreate the connection when selecting the adapter for transporting various types of services and therefore, the transport of the information flow of a specific ToS over the communication link is optimized, while maintaining the end-to-end quality of service (QoS).

21 Claims, 3 Drawing Sheets

DYNAMIC RADIO LINK ADAPTATION

BACKGROUND OF THE INVENTION

1. Field of the Invention

The present invention relates to radio link protocols and more particularly to a dynamic data link adaptation for a wireless communication system.

2. Background Information

Layering, or layered architecture is a form of hierarchical modularity that is central to data network design. A layer performs a category of functions or services. All major emerging communication technologies rest on the layers. of the OSI model, illustrated in FIG. 1-a. The OSI model defines a physical layer (Layer 1) which specifies the standards for the transmission medium, a data link layer (Layer 2), a network Layer 3 and application layers (layers 4 to 7).

Physical Layer. The function of the physical layer is to provide a physical pipe, i.e. a communication link for transmitting a sequence of bits between any pair of network elements joined by a physical communication channel. E.g. in the case of wireless networks, this is the channel that physically transports the information between the mobile station (MS) and the base transmission station (BTS), or between the BTS and the mobile switch center (MSC).

Link Layer. Each point-to-point communication link has data link control modules at each end of the link. The purpose of these modules is to exchange information elements (IE), using the physical layer.

Link protocols are a recognized mechanism used within the wired and wireless communications industries to mitigate the effects of impairments introduced by the physical transmission medium. A radio link protocol (RLP) is one that is designed for the wireless environment to deal specifically with the types of impairments found on the radio link between a mobile station (MS) and the radio access network (RAN). The detailed mechanisms employed by an RLP are usually specific to a particular air interface protocol (AIP) and are tailored to the services supported by that AIP. In general, a link protocol may provide mechanisms to deal with errors on the communications link, delays encountered in transmitting information over the communications link, information lost while transmitting over the communications link, bandwidth conservation and contention resolution.

All these AIPs define a limited number of RLPs and select the RLP for a connection during the connection setup phase based on the service requirements. The service is defined by the type of information (ToI) transmitted (i.e. voice, packet data, control packet, etc.) and by the quality of service (QoS) required. Generally speaking, the quality of service (QoS) of a particular type of service (ToS) is dependent upon the errors encountered over the communication link, the delays encountered in transmitting the information, and/or the information lost while transmitting over the communications link.

As discussed above, a radio link protocol may provide mechanisms to deal with all type of impairments introduced in the radio link by the physical transmission medium. Thus, error control schemes are currently designed for error detection only, error detection and forward error correction, or error detection and retransmission. Current delay control schemes include expedited delivery, bounded delay or unbounded delay, while loss control schemes may include assured delivery, best-effort delivery, or relay service (no recovery). Current bandwidth conservation schemes may include packet header compression, generic payload compression, or application specific compression, and contention resolution schemes may include randomized backoff interval followed by retransmission, channel reservation, round-robin or priority-based polling or adaptive power stepping followed by retransmission. This list of protocol functions is by no means exhaustive.

Network Layer. The third layer is the network layer which is responsible for routing packets from one network node to another. The network layer takes upper layer data units (packets), adds routing information to the packet header, and passes the packet to the link layer.

Transport Layer. The fourth layer is the transport layer which creates virtual end-to-end connections using network layer addressing and routing capabilities. This layer has a number of functions, not all of which are necessarily required in any given network. In general, this layer is concerned with assembling/reassembling of data units, multiplexing/demultiplexing, end-to-end error correction, flow control, etc.

The Transmission Control Protocol (TCP) shown in FIG. 1b as the transport layer, has evolved over many years of use in the wired local area network (LAN) and wide area network (WAN) arenas. However, many of the algorithms used to optimize the performance of TCP in the wired environment are based on some underlying assumptions about the wired network where the TCP is typically used.

Wired and Wireless Environment

In a wired network the bit errors rates are typically on the order of $10^{-9}$ or better, and bit errors have a tendency to be random. In general, the transmission medium is considered essentially error-free and TCP packets are lost mainly due to congestion in the intervening routers. Moreover, in a wired system the transmission channel has a constant bandwidth and is symmetrical; therefore, the characteristics of the channel in one direction can be deduced by looking at the characteristics of the channel in the other direction.

Due to the practically error-free environment of the wired networks, it is often easiest to use a common link control protocol and to solve congestion problems by "throwing bandwidth at the problem", to remove queuing bottlenecks by using higher speed transmission channels.

On the other hand, in a wireless environment, most of the above assumptions are no longer valid. The wireless channel is characterized by a high bit error rate with errors occurring in bursts that can affect a number of packets. Due to fading, due to the low transmission power available to the mobile station and to the effects of interference, the bandwidth of the channel appears to rapidly fluctuate over time resulting in a radio link that is not symmetrical.

In a wireless environment, the amount of bandwidth available to the system is fixed and scarce. Adding bandwidth on the radio link may be expensive or even impossible due to regulatory constraints.

For example, optimizing bulk file transfer in a wired environment is simply a matter of allocating as much bandwidth as possible to the connection. In a wireless environment, part of the bandwidth is used in error correction. It is known that more error correction means less payload, however, more error correction increases the probability of correct delivery without retransmissions. Thus, end-to-end throughput may actually be increased by reducing bandwidth assigned to payload and using the freed bandwidth for error correction.

Wireless network solutions targeted specifically at packet data using the Transmission Control Protocol (TCP) have been proposed but they suffer from a number of problems as they are generic to TCP with no distinction made between the requirements of the different applications that use TCP, and with no knowledge of the capabilities provided by different link and application layer protocols.

Another problem associated with the use of the TCP in a wireless network relates to a link layer which works independently of the TCP layer with no intrinsic knowledge of the control and information packet requirements of TCP. The link layer protocol may use mechanisms e.g. automatic retransmissions of lost or corrupted packets, that either duplicate or interfere with mechanisms used by TCP.

Priority-based queuing algorithms as well as parameter controlled behavior for use by RLPs have been also proposed. Priority-based queuing algorithms for use by RLPs are limited in their applicability to problems that can be solved with different queuing algorithms. Parameter controlled behavior as a means to modify the behavior of an RLP according to the values assigned to input parameters, is limited by initial decisions on which parameters are dynamic and which are not. The fundamental behavior of the RLP can not be changed and therefore, any new functions that require a new set of parametric values may be difficult to introduce. Moreover, application-specific functions can not be easily introduced.

Multimedia Wireless Communications

In the multimedia communications world, different applications have different QoS requirements with respect to bandwidth, delay, assured delivery, etc. Therefore performance of a multimedia protocol can be enhanced by using mechanisms specifically designed to overcome the impairments found in the prior art.

Current second generation (2G) wireless systems are designed mostly to handle voice traffic, with some allowances for circuit-switched data. Later, packet data services were grafted onto the 2G systems but these were uniformly treated according to "best effort delivery" schemes. The type of RLP (radio link protocol) used in 2G systems is typically based on the generic service(s) available to the MS(mobile station), as for example voice services, packet data services, and/or circuit switched data services. The voice service may use an RLP providing error detection and forward error correction, the packet data service may use an RLP providing error detection and retransmissions, while the circuit switched data service may use an RLP providing transparent bit service.

The introduction of multimedia communications in third generation (3G) wireless systems means the traffic no longer has a set of homogenous characteristics and as a result, many of the protocols for 2G wireless systems suffer from a number of design problems.

Existing wireless implementations define a limited number of RLPs (radio link protocols). The RLP for a connection is currently chosen during the connection setup phase and remains tied to the service category for the duration of the connection. To change the type of RLP, the connection must be terminated and a new connection with a different type of RLP has to be established.

Furthermore, RLP selection is currently based on the type of service (ToS) requested (e.g. voice, best effort packet data) and assumes that all services within a category have the same basic quality of service (QoS) requirements and this does not change over time. An RLP operates independently, without knowledge of the transport protocol or application requirements, and the same RLP remains in effect throughout the life of the connection, even though the requirements of the information flow may change.

Moreover, the current RLPs treat all information the same, assuming the same type of service (ToS) requirements applies to all information elements (IE). For example, in a packet mode connection, control packets that regulate the flow of information should be accorded a higher priority and greater assurance of correct delivery than data packets themselves, but they are presently treated equally. Also, RLPs are typically defined during the standardization process and no provision is made for adding a new type of information flow or a new type of service (ToS) category and its corresponding RLP. With the rapid introduction of new applications into wireless and packet data arenas, these applications may be forced to use an RLP that approximately, but does not quite, fit the application's service requirements.

Accordingly, there is a need for a providing a dynamic link layer for a multimedia wireless communication system which fits a plurality of type of service (ToS) categories of an application, and is capable to recognize different quality of service (QoS) requirements within a category.

SUMMARY OF THE INVENTION

The present invention provides an improved end-to-end quality of service (QoS) for multimedia wireless communications.

According to one aspect of the invention, a radio link system for multimedia communication between a radio access network (RAN) and a mobile station (MS) is provided for establishing a connection under RAN monitoring. A RAN connection of a communication link is used for transmitting an information element (IE) having a particular IE type of service requirements, to a plurality of RAN radio link adapter (RLA) components. Each RAN RLA is associated with a type of service and is capable of adapting the IE to a RAN frame format comprising connection information and RLA information associated with the transmitted IE. A flow analyzer is also provided to monitor the communication link, to procure the IE type of service from the RAN connection, to select a RAN RLA component with a RLA type of service substantially the same as the IE type of service and to dynamically allocate the selected RAN RLA component to the RAN connection.

According to another aspect of the invention, a radio link system for multimedia communication between a mobile station (MS) and a radio access network (RAN) for establishing a communication link between the MS and the RAN under the MS monitoring of the connection, is provided. A MS connection of a communication link is used for transmitting an information element (IE) according to a type of service requirements, to a plurality of MS radio link adapters. Each MS RLA is capable of adapting the IE to a MS frame format for transmission over the communication link to a paired RAN RLA. Both the MS RLA and the RAN RLA are selected in accordance with the quality of service (QoS) requirements associated with the IE.

According to still another aspect of the invention, a method for multimedia communication between a radio access network (RAN) and a mobile station (MS) is provided. A communication link for transmitting an information element (IE) according to a IE type of service requirements from a connection in the RAN to a mate connection in the MS, is initially established. The connection is constantly monitored at the originating end, for detecting the IE type of service requirements for a current transmission operation on the communication link. A plurality of radio link adapters (RLA) are also provided, each RLA associated with a RLA type of service for loading the IE into a RLA frame format comprising destination connection information associated with the type of IE. According to each IE type of service requirements identified, an RLA component associated with the IE type of service identified is dynamically allocated to the originating connection end. The destination connection information contained in the RLA frame includes a connection identifier and an RLA identifier for selecting and allocating at the other end of the connection a second RLA component having the same RLA type of service. Either the RAN or the MS can monitor the communication link.

Advantageously, according to the invention, the dynamic selection of the type of RLA to transport information is performed without having to tear-down and re-create a connection. The transport of the information flow of a specific type of service over the radio link is optimized and an end-to-end quality of service (QoS) is maintained.

The invention uses link adaptation techniques that are specifically tailored to the needs of a particular type of information flow, or of a particular end-to-end transport protocol. The operation of each RLA may be tailored to provide services that closely match the requirements of a specific end user or of a particular information flow, or of a type of service. RLA selection may be based on the end user's profile, on the type of service selected, on the changing characteristics of the information flow, on the type of information element detected within the flow, and/or on the current conditions of the radio link.

Other aspects and features of the present invention will become apparent to those skilled in the art upon review of the following description of specific embodiments of the invention in conjunction with the accompanying drawings.

DESCRIPTION OF THE DRAWINGS

FIG. 1-a shows the OSI layers in general; FIG. 1-b shows the link layer affected by the link protocol; and FIG. 1-c shows the area of operation for a link adapter in the open systems interconnect model;

DETAILED DESCRIPTION OF THE EMBODIMENTS

Figure 1:
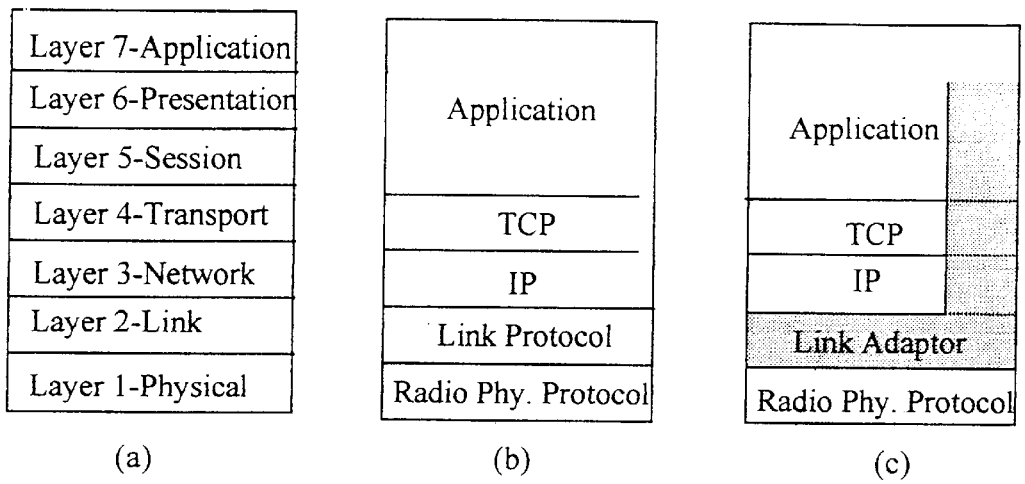
FIGS. 1-a to 1-c show the OSI model and its application to this invention.

FIGS. 1-a to 1-c show the OSI model and its application to this invention. FIG. 1-a show the OSI layers in general, and FIG. 1-b show the OSI layer affected by the link protocol. As shown in FIG. 1-b, a link protocol typically only operates at Layer 2 the link layer, of the protocol stack. The link protocol provides a fixed set of services to Layer 3 the Network Layer, and has no knowledge of the protocols used outside Layer 2.

The present invention provides a method and apparatus for improving the quality of service (QoS) for multimedia communications over a radio link, while giving priority to correctly delivering acknowledgments for information already received. According to the invention, a radio link adapter (RLA) is designed to provide services that closely match the type of service (ToS) requirements and that can be dynamically selected to transport information without having to recreate a connection.

A link adapter may operate at any and all levels of the protocol stack used between the sender and the receiver. In practical terms, this means that the link adapter of the invention extracts information from anywhere in the communications environment and manipulates any of the protocols used between the sender and the receiver, as shown in FIG. 1-c.

The radio link adapter concept falls into a general class of protocol enhancement techniques known as "protocol boosters" that are designed to provide improved end-to-end protocol performance without changing the semantics of the end-to-end protocol. Thus, while the effects of the RLA protocol booster may be apparent to the communicating end points, e.g. improved throughput, the mechanisms and protocols used internally by this RLA protocol booster are transparent to the end points.

The "boosters" known in the art so far are static boosters. Dynamic selection of an RLA allows the wireless system to determine the service requirements of an information flow and to quickly change the way that service is provided, as the needs of the flow change and as the conditions on the radio link change. The latter is particularly important in a wireless environment. Protocols that are in widespread use today, like the Transmission Control Protocol (TCP), have been developed for use in a wired environment where the link is very stable. However, the conditions on the radio link fluctuate rapidly due to fading and interference and therefore, the wireless system must be able to react quickly to shield protocols like TCP from those changes and to maintain the end-to-end quality of service (QoS).

Figure 2:
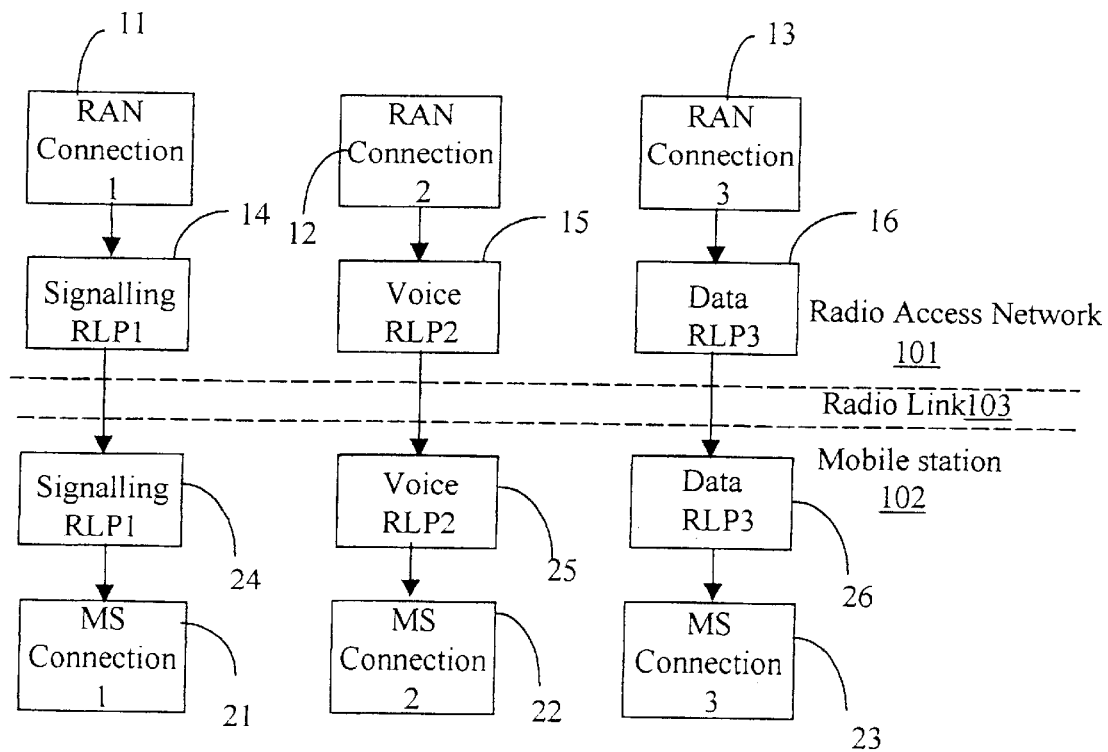
FIG. 2 illustrates an example of radio link protocol architecture for a current wireless multimedia communications system.

FIG. 2 illustrates a radio link protocol architecture illustrating a sample current network, showing a radio access network (RAN) 101 and a mobile station (MS) 102. For each type of service (ToS), a communication link is established between RAN 101 and mobile 102 over air interface 103.

The end of each link is intuitively shown in RAN 101 by connection units 1–3 denoted with 11, 12, and 13, linked with corresponding connections 21, 22, and 23 in MS 102. The term "connection" is used to designate a unidirectional facility/mechanism that allows information to be exchanged between two or more points in a communication network. It includes both circuit and packet modes of communications.

Three different types of radio link protocols (RLPs) are illustrated in FIG. 2, each having a RAN component and a MS component. These are a signaling RLP 14, 24, a voice RLP 15, 25 and a packet data RLP 16, 26. Signaling RLP 14, 24 is designed to handle high-priority, packet-based signaling traffic between the RAN and the MS. Voice RLP 15, 25 is designed to transport voice traffic between the RAN and the MS. Packet data RLP 16, 26 is designed to transport packet data traffic between the RAN 101 and the MS 102 on a "best effort" basis.

The following steps are currently performed for sending information from RAN 101 to MS 102.
  a. A higher level entity (not shown) requests that a signaling connection 11 be established to transport information between the RAN 101 and the MS 102. No further information is needed since the quality of service (QoS) afforded by connection 11 is dictated by the type of traffic, which is signaling in this example, and the RLP 14 is defined a priori to carry this traffic.

b. RAN 101 indicates to MS 102 that a signaling connection is required and they handshake using the air interface protocol (AIP) to establish the corresponding connection 21 in MS 102 along with its corresponding RLP 24.

A voice connection 12, 22 is created in a similar way through the voice RLPs 15, 25, and a packet data connection 13, 23 is created through the packet data RLPs 16, 26.

c. Once the connections have been established, when information is to be sent from the RAN 101 to the MS 102, a higher-level entity (not shown) determines the type of information (ToI) to be sent (signaling, voice, or packet data), and enqueues the information to be transmitted over the appropriate connection 11, 12 or 13, respectively.

d. All signaling information sent on connection 11 is delivered using RLPs 14 and 24 regardless of whether the information represents a high priority connection control message, or a low priority location management message.

Similarly, all voice information sent on connection 12 is delivered using RLPs 15 and 25 regardless of whether the information represents an active speech spurt or background noise. It is to be noted that the channel coding used for an active speech spurt is different from that used for background noise. This may be considered a primitive form of dynamic radio link adaptation.

All information transmitted over the RAN connection 13 is delivered to MS connection 23 using the data RLPs 16 and 26, regardless of the characteristics of the information flow. For example, bulk file transfer often considered a "low priority" activity, uses the same RLPs 16 and 26 as an interactive query, which is considered a "high priority" activity.

Figure 3:
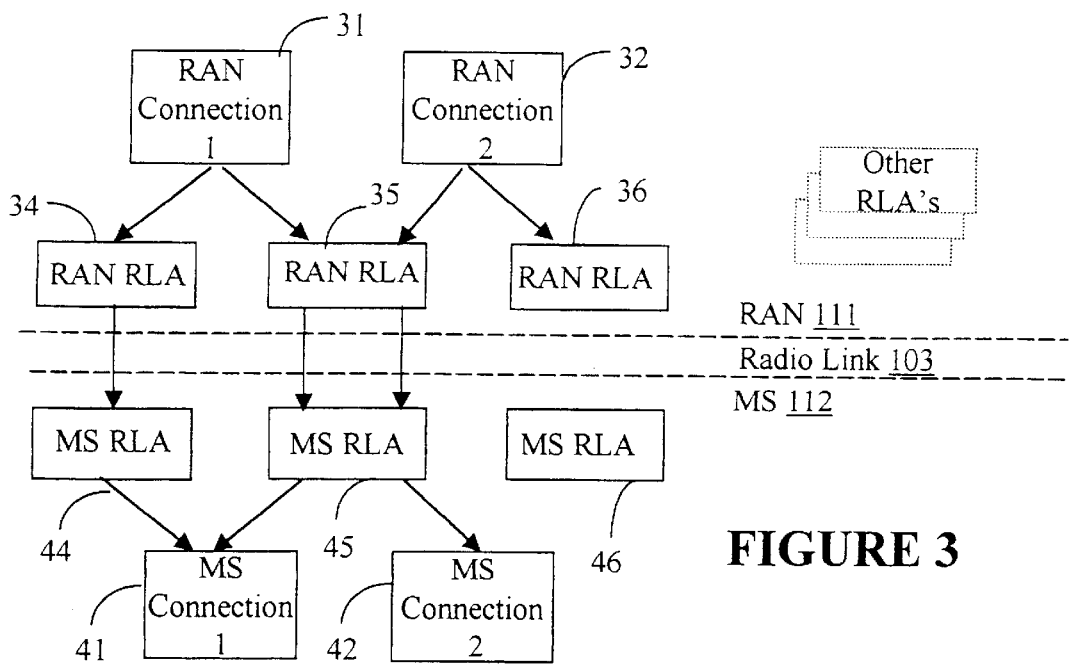
FIG. 3 is a functional block diagram showing the allocation of a radio link adapter to a connection, according to the invention.

By contrast, FIG. 3 is a functional block diagram showing the dynamic allocation of a radio link adapter (RLA) to a connection in a wireless multimedia communications system. The system of FIG. 3 includes a number of radio link adapters (RLAs) namely RLAs 34–36 in the radio access network (RAN) 111 paired with RLAs 44–46 in the mobile station (MS) 112. Each RLA communicates with its pair instance. For example, the RLA 34 in the RAN 111 only communicates with the RLA 44 in the MS 112, RLA 35 with RLA 45, and RLA 36 with RLA 36.

Each adapter is associated with a particular type of service (ToS). FIG. 3 illustrates RAN adapters 34–36, as well as MS adapters 44–46, but any number of other RLAs may also exist, as needed.

For connections from RAN 111 to MS 112, RLA selection is accomplished through the following procedure:

A connection 31 is initially created in RAN 111 to transport information from the RAN 111 to a connection 41 in the MS 112.

Based on information either included in the connection setup request, or derived from the MS 112 profile, or negotiated between the MS 112 and the RAN 111, an initial service requirement is determined, and a corresponding RLA pair, let's say RLA 35 and RLA 45, is identified. Other connections between the RAN 111 and the MS 112 may also exist, like for example connection 32–42, and may use the same adapter type, or a different type of RLA.

As RAN 111 exchanges information with the MS 112, the RAN monitors connection 31 (and all other active connections) to determine if the service requirements of the connection 31 are still being met by the RLA 34.

If RAN 111 determines that the service requirements of an individual information element, e.g. a control packet, cannot be satisfied by the adapters 35 and 45 currently used, the information element (IE) is directed to another RLA that can provide the appropriate type of service (ToS), e.g. to the RLA pair 34, 44. Other information elements (IEs) continue to flow through the RLA 35. At the MS 112, all information elements (IEs) are directed to connection 41 regardless of the adapters used to deliver the information element (IE) between the RAN 111 and the MS 112 connections.

If RAN 111 determines that the service requirements of the entire connection cannot be satisfied by the currently used adapters, all future information elements meeting the new type of service (ToS) traveling over connection 31–41 are redirected to an adapter that can satisfy the requirements.

The selection of a new adapter may be triggered by any one of a number of mechanisms. These mechanisms may include an explicit request from the MS 112 received either over a separate signaling connection or in-band over the same connection used to carry information elements. A new adapter could be selected based on an analysis of the dynamic traffic characteristics exhibited by the information flowing over the connection, or the interpretation of the information or portions of the information elements like control information contained in an information element header. Selection can also be made based on the recognition/identification of a particular information element carried over the connection e.g. an "open file" request, or based on the current conditions on the radio link, e.g. changes in congestion or bit error rate.

For establishing a connection from the MS 112 to the RAN 111, a similar process takes place but with the roles reversed. The MS 112 monitors the connection and initiates changes in the adapters being used.

Figure 4:
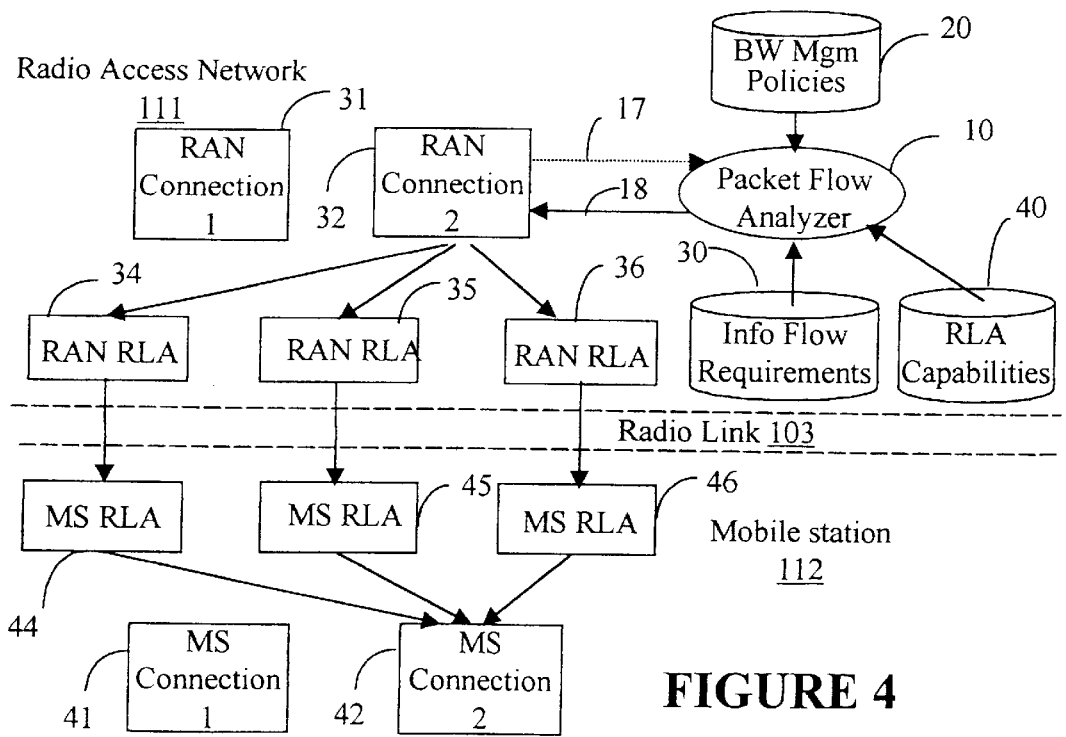
FIG. 4 is a functional block diagram for a wireless multimedia communications system using the dynamic radio link adaptation according to the invention.
Figure 5:
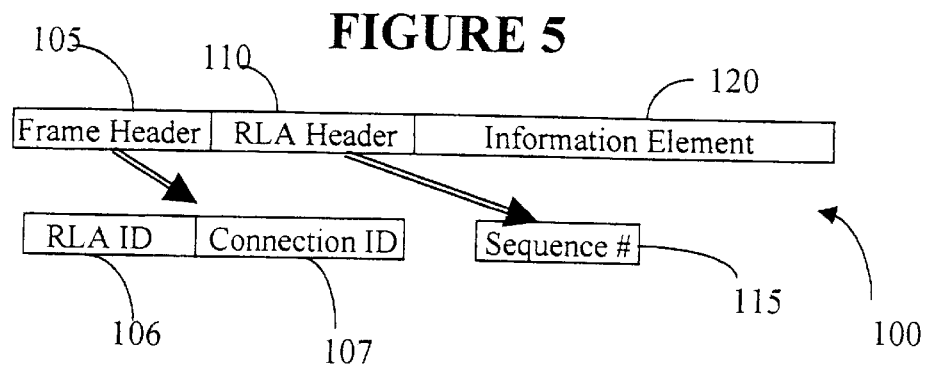
FIG. 5 illustrates an example of a radio link adapter frame formed according to the invention.
Figure 6:
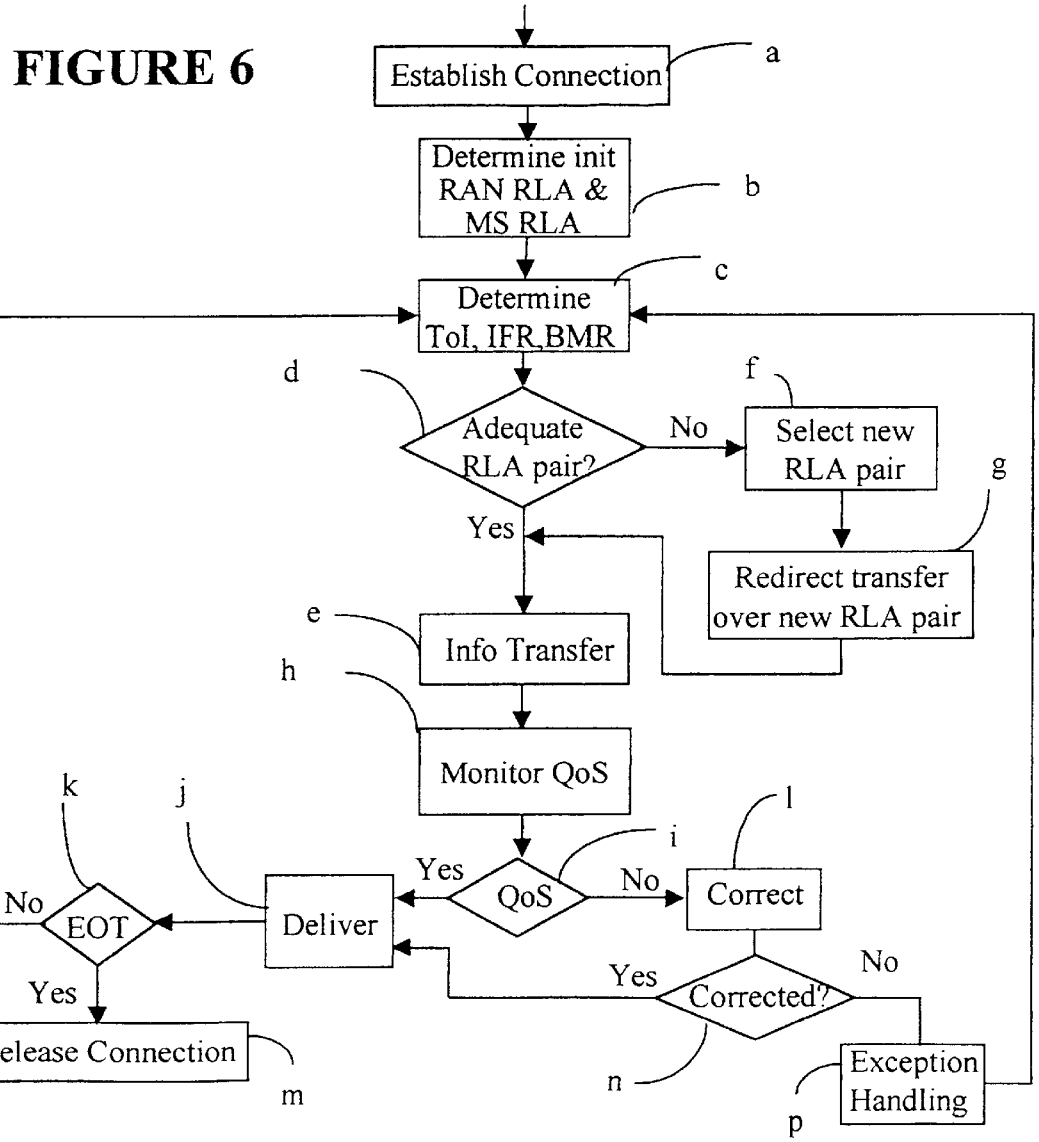
FIG. 6 is a flow chart used to illustrate the steps of the radio link adaptation according to the invention.

FIG. 4 is a functional block diagram showing a wireless multimedia communications system using dynamic radio link adaptation. The particular example shown in this figure refers to a bulk file transfer application, and it is described using also FIGS. 5 and 6. FIG. 5 illustrates an example of a radio link adapter frame according to the invention, while FIG. 6 is a flow chart used to illustrate the method steps of the radio link adaptation.

Each of the radio access network 111 and the mobile station 112 includes instances of radio link adapters (RLAs) 34–36, and respectively 44–46, each RLA pair being associated with a particular type of service (ToS). Thus, RLA 34 in the RAN 111 only communicates with RLA 44 in the MS 112, RLA 35 with RLA 45, and RLA 36 with RLA 46. The capabilities of each RLA are tailored to optimize the transportation of a specific information or class of information flow over the radio link 101. It is to be understood that the number of RLA pairs could be higher than three, depending on the services available to the respective network and the mobile station (MS).

FIG. 4 shows again only two connections, namely connection 31–41 and connection 32–42. Each RAN connection is continuously monitored by a packet flow analyzer 10 for determining the type of service over the respective connection; if the current RLA associated with the connection can satisfy the required quality of service (QoS); and if not, if there is another RLA which could.

Packet flow analyzer 10 has knowledge of information flow requirements (IFR) for each connection, which are stored in a database 30. Analyzer 10 also uses a database 20 with bandwidth management policies (BMP), the policies being associated with the end user and/or the wireless system operator. In addition, the RLA capabilities are stored in database 40.

Packet flow analyzer 10 monitors the information flow over each RAN connection, shown by arrow 17. Analyzer 10 also controls how the information flowing through the connection 32 should be transported over the radio link 103 to MS 112, shown by arrow 18.

FIG. 6 illustrates the steps of a radio link adaptation performed by the adapter of FIG. 4, and using radio link adapter frames as illustrated in FIG. 5, all according to the invention.

Connection Setup

In this example using a bulk file transfer, the operation begins with a higher-level entity (not shown) requesting a connection, step a, for linking the RAN 111 and the MS 112. Let's say that a connection 32 is established in RAN 111. Based on information either included in the connection setup request, or derived from the MS 112 profile, or negotiated between the MS 112 and the RAN 101, an initial service requirement is determined, and RLA 34 is identified for use by connection 32, as shown in step b.

The RAN 111 indicates to the MS 112 that a connection is required and they handshake using the air interface protocol (AIP), to establish the corresponding connection 42 in MS 112, along with its corresponding RLA 44 step b.

RLA Selection

The packet flow analyzer 10 receives monitoring data 17 related to connection 32–42, as shown in step c. Packet flow analyzer 10 determines that the information being carried on this connection is a part of a bulk file transfer, in this example. Flow classification may be based on the content of information elements (IEs) like well-known protocol identifiers found in a packet header, or on the dynamic behavior of the flow like the size and frequency of the packets, or on the network configuration parameters like the physical link identifier, or on the node address.

The analyzer 10 uses the RLA capabilities database 40 to compare the capabilities of the RLA 34 to the information flow requirements 30 and to the bandwidth management policies 20 of the system, step d. Let's say that, from this comparison, analyzer 10 determines that the type of service (ToS) requirements of the bulk file transfer information flow on connection 32–42 cannot be satisfied by the RLA 34, but can be satisfied by the RLA 35, shown by branch "No" of decision block d.

The packet flow analyzer 10 sends a control signal 18 instructing connection 32–42 to select a new type of RLA pair 35–45 for example, if it is more adequate for the type of service (TOS) requested, step f, and redirects all its information elements to this RLA pair, shown in step g.

If the type of service can be handled satisfactory by the RLA pair 34–44, as shown by branch "Yes" of decision block d, a new RLA pair is not selected, and the transfer of information continues over the first RLA pair 34–44.

Information Transfer

The RLA pair 35–45 (or the like) allocated to a required ToS (Type of Service) then performs any operations defined by its behavior, including modifications or additions to the original information element, and then initiates transmission of RLA frames over the Radio Link 103 to the MS 112, step e.

A RLA frame 100 is shown in FIG. 5 as an example. Frame 100 includes a frame header 105, an RLA header 110, and an information element (IE) 120. A field 106 in frame header 105 is used by the MS 112 to determine which radio link RLA should receive the information element (IE). In the example of FIG. 4, field 106 will reference the RLA 45.

RLA 45 uses a connection identifier 107, also contained in the RLA frame header 105, to determine which connection should receive the information element. In this case, the identifier 107 will reference connection 42.

Monitoring QoS

The information elements received by RLA 45 are regularly examined to ensure that they conform to the quality of service (QoS) associated with this RLA, steps h and i.

Information for use by the RLA pair 35, 45 may be contained in an RLA header 110 associated with the RLA frame 100. The format and content of the RLA header 110 is RLA-specific and forms part of a protocol that originates with the RAN RLA 32 and terminates on the MS RLA 42.

For example, let's say that the service provided by the RLAs 35, 45, requires to deliver all frames to connection 42 in the same order they were transmitted. In this case, a sequence number could be added to the frame by the RAN RLA 35 in field 115, and used by the MS RLA 45 to determine the correct position of the information element (IE) within the connection.

In the case of a bulk file transfer information flow, the QoS may include assured delivery of the information elements. Frames 100 are examined in steps h and i to check if they have been received without errors. Information elements (IEs) meeting the QoS (quality of service) defined by the RLA 45 are delivered to the appropriate connection 42, step j. If information elements (IEs) do not correspond to the QoS requested, the RLA instances 35, 45 interact using a protocol or other mechanisms unique to this RLAs, to overcome the radio link impairment, shown in step 1.

If RLA instances 35, 45 cannot overcome the radio link impairments in order to provide an information element (IE) with the required QoS, the treatment accorded non-conforming information elements is dependent on the exception-handling behavior defined for the RLA 34. This may include silently discarding the information element (IE); discarding the information element (IE) and signaling an error to the connection 42; forwarding the information element (IE) as-is to the connection 42 along with a warning that the element (IE) does not meet the ToS criteria of the respective RLA; forwarding the information element (IE) as-is to connection 42 with no warning; or terminating the connection 42. In the case of bulk file transfer, the exception-handling behavior for RLA 45 may be "silently discard", knowing that the higher-level TCP incorporates its own retransmissions mechanisms, step p.

Steps k and m show the end of information transfer (EOT) and of the connection.

Changing the Type of RLA

The RLAs are dynamically assigned to a connection. The current RLA pair may be changed for one of many reasons.

At some point during information transfer, the higher-level entity (not shown) sends a TCP acknowledgment packet over connection 32–42. The packet flow analyzer 10 receives monitoring data 17 related to connection 32 and determines that the acknowledgment is a control element that must be treated differently from the other information elements (IEs) comprising the bulk file transfer.

In this case, the packet flow analyzer 10 selects a new type of RLA that can satisfy the requirements of the connection, step f, and sends control signal 18 instructing RAN connection 32 to redirect the control element to RLA 34, step g. Other information elements (IEs) will continue to flow through the RLA 35. The RLA is changed when the type of information (ToI), or the quality of service (QoS) requirements change.

As indicated above, analyzer 10 monitors continuously the flow of information, steps c and d and the RLAs attempt to overcome some or all of the failure in service of the transmission. The packet flow analyzer 10 compares the capabilities of the RLA 35 to the information flow requirements (IFR) 30 and to the Bandwidth Management Policies (BMP) 20 of the system, step d. Let's say that from these data, the analyzer 10 determines that the QoS requirements of the information elements cannot be satisfied by the RLA 35 but can be satisfied by the RLA 36, branch "No" of decision block d.

At the MS 112, the RLA identifier 106 is used to determine that this radio link adapter frame should be processed by the MS RLA 46. The received information element is examined by the MS RLA 46 to ensure that it conforms to the QoS requirements associated with it, steps i. If it does not, e.g. due to errors on the radio link or congestion in the RAN 111, the RAN RLA 36 and the MS RLA 46 components interact to overcome the radio link impairment, step l. As indicated above, they may use a protocol or other mechanisms unique to these RLAs.

The RLA 36 uses the connection identifier 107 included in the received RLA frame to identify the connection associated with the element and uses the sequence number 115 to determine the temporal ordering of elements within the connection. Information elements meeting the QoS requirements associated with the RAN RLA 36 are delivered to MS connection 42. The treatment accorded to information elements that do not meet the QoS requirements associated with the RLA 36 is dependent on the exception-handling behavior defined for this RLA (step p).

Numerous variations, modifications and adaptations may be made to the particular embodiments of the invention described above without departing from the scope of the invention as defined in its claims.

We claim:

1. A radio link system for multimedia communication between a radio access network (RAN) and a mobile station (MS) comprising:
   in said RAN,
   a connection of a communication link for transmitting an information element (IE) according to an IE type of service requirements;
   a plurality of radio link adapter (RLA) components, each RLA being associated with a RLA type of service, said RLA for adapting said IE to a RLA frame format comprising destination connection information associated with said IE; and
   a flow analyzer for monitoring said communication link, procuring from said RAN said IE type of service requirements, selecting a RAN RLA component with a RLA type of service substantially identical to said IE type of service requirements and dynamically allocating said RAN RLA component to said connection.

2. A radio link system as claimed in claim 1, wherein said IE type of service requirements include type of information (ToI) and quality of service (QoS) data.

3. A radio link system as claimed in claim 1, wherein said IE comprises at least one of data, voice, and video information units.

4. A radio link system as claimed in claim 1, wherein said RLA frame format comprises a frame header containing said destination connection information, a RLA header, and said IE.

5. A radio link system as claimed in claim 4, wherein said destination connection information comprises an RLA identification for selecting, a corresponding MS RLA component and a connection identification for associating said MS RLA with a corresponding connection at said MS.

6. A radio link system as claimed in claim 4, wherein said RLA header is used for communication between said RAN RLA component and said MS RLA component.

7. A radio link system as claimed in claim 1, further comprising a database for storing a plurality of said IE type of service requirements.

8. A radio link system as claimed in claim 7, further comprising a database with a list of each RLA component of the radio link system and said associated RLA type of service.

9. A radio link system for multimedia communication between a mobile station (MS) and a radio access network (RAN) comprising:
   at said MS,
   a connection of a communication link for transmitting an information element (IE) according to a IE type of service requirements;
   a plurality of radio link adapter (RLA) components, each RLA being associated with a RLA type of service for adapting said IE to a RLA frame format for transmission over said communication link; and
   a MS RLA selected from said plurality of RLA components according to said IE type of service requirements to be paired with a RAN RLA selected according to said IE type of service requirements.

10. A method for multimedia communication between a radio access network (RAN) and a mobile station (MS) comprising the steps of:
    establishing a communication link for transmitting an information element (IE) according to a IE type of service requirements, from a connection at one end of said communication link to a mate connection at the other end;
    monitoring said connection for detecting said IE type of service requirements for a current transmission operation on said communication link;
    providing a plurality of radio link adapter (RLA) components, each RLA associated with a RLA type of service, said RLA for loading said IE into a RLA frame format comprising destination connection information associated with said IE;
    selecting a RLA component from said plurality of RLAs according to said IE type of service requirements; and
    dynamically allocating said RLA component to said connection.

11. A method as claimed in claim 10, further comprising allocating a new RLA component to said connection, whenever said IE type of service requirements change.

12. A method as claimed in claim 10, wherein said step of establishing a communication link comprises:
    establishing a communication channel between said connection and said mate connection; and
    associating a default RLA component to said connection.

13. A method as claimed in claim 10, further comprising providing RLA identification data in said RLA frame for associating a peer RLA component to said mate connection.

14. A method as claimed in claim 10, wherein said step of selecting comprises maintaining a database comprising:
    a plurality of type of services requirements and a list with all said RLA components and their associated RLA type of service;
    comparing the RLA type of service with the IE type of service requirements;
    detecting a RLA type of service substantially similar to said IE type of service requirements; and
    selecting said RLA component according to said detected RLA type of service.

15. A method as claimed in claim 14, wherein said database comprises bandwidth management policies associated with the wireless subscriber, the MS and/or the wireless network operator.

16. A method as claimed in claim 14, wherein said database comprises information flow requirements.

17. A method as claimed in claim 10, wherein the step of dynamically allocating comprises selecting a new RLA component whenever said IE type of service requirements change.

18. A method as claimed in claim 10, wherein said step of monitoring comprises determining any change in said type of service.

19. A method as claimed in claim 10, wherein said type of service includes type of information (ToI) for transfer and quality of service (QoS) data.

20. A method as claimed in claim 10, wherein said step of monitoring comprises:

determining a change in said IE type of service requirements; and if said change refers to the type of information (ToI) carried by said IE, selecting a new RLA component and allocating same to said connection.

21. A method as claimed in claim 20, wherein said step of monitoring comprises:

determining a change in said IE type of service requirements;

if said change refers to a decrease in the quality of service (QoS) provided to said IE, applying a correction protocol available to said RLA; and allocating a new RLA component to said connection, based on said IE type of service requirements, if the decrease in quality of service (QoS) cannot be corrected with said correction protocol.

* * * * *